(12) United States Patent
Zhou et al.

(10) Patent No.: US 10,438,736 B2
(45) Date of Patent: Oct. 8, 2019

(54) MAGNETIC COMPONENT AND MANUFACTURING METHOD THEREOF

(71) Applicant: Delta Electronics (Shanghai) Co., Ltd., Shanghai (CN)

(72) Inventors: Jinping Zhou, Shanghai (CN); Zhangnan Xin, Shanghai (CN); Pengkai Ji, Shanghai (CN); Yi-Min Hsieh, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/259,721

(22) Filed: Jan. 28, 2019

(65) Prior Publication Data
US 2019/0172629 A1    Jun. 6, 2019

Related U.S. Application Data

(63) Continuation-in-part of application No. 15/920,548, filed on Mar. 14, 2018, now Pat. No. 10,242,791,
(Continued)

(30) Foreign Application Priority Data

Oct. 28, 2016   (CN) .......................... 2016 1 0969989
May 5, 2017    (CN) .......................... 2017 1 0312684
(Continued)

(51) Int. Cl.
*H01F 27/24*    (2006.01)
*H01F 27/28*    (2006.01)
(Continued)

(52) U.S. Cl.
CPC ....... *H01F 27/2823* (2013.01); *H01F 27/255* (2013.01); *H01F 27/29* (2013.01);
(Continued)

(58) Field of Classification Search
CPC .... H01F 27/2823; H01F 27/255; H01F 27/24; H01F 27/28; H01F 27/29; H01F 27/02;
(Continued)

(56) References Cited

U.S. PATENT DOCUMENTS 7,289,329 B2   10/2007   Chen et al.
8,378,777 B2 *  2/2013   Yan ..................... H01F 17/0013
                                                        336/192
(Continued)

FOREIGN PATENT DOCUMENTS

CN   203659591 U   6/2014
CN   104021920 A   9/2014
(Continued)

*Primary Examiner* — Adolf D Berhane
(74) *Attorney, Agent, or Firm* — Kirton McConkie; Evan R. Witt

(57) ABSTRACT

A magnetic component and a manufacturing method thereof are provided. The magnetic component includes a magnetic core, a first winding set and a second winding set. The magnetic core is made of a magnetic powder material and includes two connecting portions connected through three magnetic columns to form a first side and a second side opposite to each other. The first winding set and the second winding set are made by a flat conductive body, and spaced apart on the middle magnetic column at a distance. The first winding set includes two first conducting portions connected through a first horizontal portion. The second winding set includes two second conducting portions connected through a second horizontal portion. The first horizontal portion and the second horizontal portion are exposed to the first side,
(Continued)

and the two first conducting portions and the two second conducting portions are extended to the second side.

25 Claims, 20 Drawing Sheets

Related U.S. Application Data which is a continuation-in-part of application No. 15/784,864, filed on Oct. 16, 2017, now Pat. No. 10,062,499.

(30) Foreign Application Priority Data

May 5, 2017 (CN) .......................... 2017 1 0313185
Jan. 7, 2019 (CN) .......................... 2019 1 0013480

(51) Int. Cl.
  *H01F 27/29* (2006.01)
  *H01F 41/04* (2006.01)
  *H01F 41/02* (2006.01)
  *H01F 27/255* (2006.01)
  *H02M 3/04* (2006.01)

(52) U.S. Cl.
  CPC ......... *H01F 41/0246* (2013.01); *H01F 41/04* (2013.01); *H02M 3/04* (2013.01)

(58) Field of Classification Search
  CPC .......... H05K 1/11; H05K 1/115; H05K 1/181; H05K 1/185; H05K 2201/1008; H01M 3/04

See application file for complete search history.

(56) References Cited

U.S. PATENT DOCUMENTS

| | | | |
|---|---|---|---|
| 10,062,499 B2* | 8/2018 | Ji | ........................ H01F 27/2847 |
| 10,242,791 B2* | 3/2019 | Zhou | ....................... H01L 27/02 |
| 2004/0174241 A1 | 9/2004 | He et al. | |
| 2009/0167477 A1 | 7/2009 | Feng et al. | |
| 2010/0007451 A1 | 1/2010 | Yan et al. | |
| 2014/0085848 A1 | 3/2014 | Zeng et al. | |
| 2015/0194254 A1 | 7/2015 | Dai et al. | |
| 2016/0141088 A1 | 5/2016 | Dai et al. | |
| 2016/0181001 A1 | 6/2016 | Doljack et al. | |
| 2017/0104419 A1 | 4/2017 | Zeng et al. | |
| 2017/0141695 A1 | 5/2017 | Zeng et al. | |
| 2017/0250025 A1 | 8/2017 | Wei et al. | |
| 2017/0287615 A1 | 10/2017 | Lu et al. | |
| 2017/0301961 A1 | 10/2017 | Kim et al. | |
| 2018/0122562 A1* | 5/2018 | Ji | ........................ H01F 27/2847 |
| 2018/0124922 A1* | 5/2018 | Ji | ........................ H01L 23/3121 |

FOREIGN PATENT DOCUMENTS

| | | | |
|---|---|---|---|
| CN | 104966604 A | 10/2015 | |
| CN | 104980003 A | 10/2015 | |
| WO | 2011088777 A1 | 7/2011 | |

* cited by examiner prefabricating a winding assembly, wherein the winding assembly includes a first winding set and a second winding set, wherein the first winding set includes a first horizontal portion and two first conducting portions, and the two first conducting portions are vertically extended from two ends of the first horizontal portion to form connection terminals of the first winding set; wherein the second winding set includes a second horizontal portion and two second conducting portions, and the two second conducting portions are vertically extended from two ends of the second horizontal portion to form connection terminals of the second winding set, wherein the first horizontal portion of the first winding set and the second horizontal portion of the second winding set are coplanar to form a first coplanar surface and spaced apart with each other at a distance. — S01 forming at least one second limitation part to connect the first winding set and the second winding set. — S02 molding the winding assembly and the second limitation part on the first coplanar surface to form a magnetic core by at least one magnetic powder material through a molding tool wherein the magnetic core partially covers the winding assembly, exposes at least the first horizontal portion and the second horizontal portion on the first coplanar surface, and exposes the connection terminals of the first winding set and the connection terminals of the second winding set on a second coplanar surface, wherein the first coplanar surface and the second coplanar surface are opposite to each other. — S03

FIG. 16

MAGNETIC COMPONENT AND MANUFACTURING METHOD THEREOF

CROSS-REFERENCE TO RELATED APPLICATION

This application claims priority to China Patent Application No. 201910013480.8, filed on Jan. 7, 2019. This application is a continuation-in-part application of U.S. application Ser. No. 15/920,548 filed on Mar. 14, 2018, and entitled "POWER MODULE AND MAGNETIC COMPONENT THEREOF", which is a continuation-in-part application of U.S. application Ser. No. 15/784,864 filed on Oct. 16, 2017, and entitled "COUPLED-INDUCTOR MODULE AND VOLTAGE REGULATING MODULE COMPRISING THE SAME". The entire contents of the above-mentioned patent applications are incorporated herein by reference for all purposes.

FIELD OF THE INVENTION

The present invention relates to a magnetic component, and more particularly to a magnetic component with low profile height, small leakage flux and simplified process and a manufacturing method thereof.

BACKGROUND OF THE INVENTION

In recent years, with the development of technologies such as data center, artificial intelligence and the like, the CPU, the GPU and the various integrated circuits (ICs) have increasingly higher speed and larger working current. Consequently, an increasingly stricter requirement is imposed to the power density, efficiency and dynamic performance of the voltage regulating module (VRM) serving for powering the CPU, the GPU and the various integrated circuits (ICs), and makes a greater challenge to the design of the VRM. In the voltage regulating module, the output inductor usually has the greatest volume, and the selection of the inductance would directly affect the efficiency and dynamic performance of the entire VRM. One approach to reduce the volume of the inductor and improve the efficiency and dynamic performance of the inductor is adopting an inverse-coupled-inductor module, which is a trend of VRM design currently. However, the conventional inverse-coupled-inductor module usually has a greater height and thus cannot be applied to some conditions with relatively high requirements on VRM height.

For a conventional coupled inductor structure, if the basic structure adopts a vertical magnetic flux structure, the plane of the magnetic flux is vertical to the plane of pins, and the height of the overall inductor includes the height of the two layers of magnetic cores and the height of the two layers of winding sets. The overall height of structure is high. Alternatively, if the basic structure adopts a horizontal magnetic flux structure, the plane of the magnetic flux is parallel to the plane of pins, and the height of the overall inductor includes the height of one layer of magnetic core and the height of two layers of winding sets. It benefits to reduce the overall height. However, in the application of thin inductors, the footprint is larger and the magnetic flux distribution is very uneven. Furthermore, the combination of the magnetic core and the winding sets is often labor intensive.

Therefore, there is a need of providing a magnetic component and a manufacturing method thereof to overcome the above drawbacks.

SUMMARY OF THE INVENTION

An aspect of the present invention is to provide a magnetic component and a manufacturing method thereof. The magnetic core and the winding sets are combined to form a low profile magnetic component. The overall height of the magnetic component is thin and suitable for applications critical to the requirements of height. The thickness and cross-sectional area of the winding sets are large, and the DC resistance is small, which can reduce the loss of the winding sets of the inductor and strengthen the strength of the structure at the same time. Moreover, it benefits to obtain lower thermal resistance in the height direction through the exposure of the winding sets and the extension of the connection terminals. In addition, for some embodiments, the manufacturing process of the magnetic component is simplified, the winding sets can be pre-formed, and it is not necessary to bend the winding sets together with the magnetic core to damage the magnetic core. Consequently, the purposes of simplifying the manufacturing process and reducing the production cost are achieved at the same time.

In accordance with an aspect of the present invention, a magnetic component is provided. The magnetic component includes a magnetic core, a first winding set and a second winding set. The magnetic core is a monolithic magnetic core and includes a first magnetic column, a second magnetic column, a third magnetic column and two connecting portions. The magnetic core forms at least one air gap, a first side and a second side. The first side and the second side are opposite to each other. The two connecting portions are connected with each other through the first magnetic column, the second magnetic column and the third magnetic column. The first magnetic column is located between the second magnetic column and the third magnetic column. The first winding set and the second winding set are disposed on the first magnetic column of the magnetic core, spaced apart with each other at a distance and free of overlapping the at least one air gap. The first winding set includes a first horizontal portion and two first conducting portions, and the two first conducting portions are connected to each other through the first horizontal portion. The second winding set includes a second horizontal portion and two second conducting portions, and the two second conducting portions are connected to each other through the second horizontal portion. The first horizontal portion and the second horizontal portion are at least partially exposed to the first side. The two first conducting portions and the two second conducting portions are extended to the second side to form connection terminals of the first winding set and connection terminals of the second winding set, respectively.

In accordance with another aspect of the present invention, a magnetic component is provided. The magnetic component includes a magnetic core, a first winding set and a second winding set. The magnetic core includes a first magnetic column, a second magnetic column, a third magnetic column and two connecting portions, and forms at least one air gap, a first side and a second side. The first side and the second side are opposite to each other. The two connecting portions are connected with each other through the first magnetic column, the second magnetic column and the third magnetic column, and the first magnetic column is located between the second magnetic column and the third magnetic column. The at least one air gap is disposed on the first magnetic column. The first winding set and the second winding set are disposed on the first column of the magnetic core, spaced apart with each other at a distance and free of overlapping the at least one air gap. The first winding set includes a first horizontal portion and two first conducting portions, and the two first conducting portions are connected to each other through the first horizontal portion. The second winding set includes a second horizontal portion and two second conducting portions, and the two second conducting portions connected to each other through the second horizontal portion. The first horizontal portion and the second horizontal portion are at least partially exposed to the first side, and the two first conducting portions and the two second conducting portions are extended to the second side to form connection terminals of the first winding set and connection terminals of the second winding set, respectively.

In accordance with further one aspect of the present invention, a magnetic component is provided. The magnetic component includes a magnetic core, a first winding set and a second winding set. The magnetic core is made of a magnetic powder material. The magnetic core includes a first magnetic column, a second magnetic column, a third magnetic column and two connecting portions, and forms a first side and a second side. The first side and the second side are opposite to each other. The two connecting portions are connected with each other through the first magnetic column, the second magnetic column and the third magnetic column, and the first magnetic column is located between the second magnetic column and the third magnetic column. The first winding set and the second winding set are disposed on the first magnetic column of the magnetic core, spaced apart with each other at a distance. The first winding set includes a first horizontal portion and two first conducting portions, and the two first conducting portions are connected to each other through the first horizontal portion. The second winding set includes a second horizontal portion and two second conducting portions, and the two second conducting portions connected to each other through the second horizontal portion. The first horizontal portion and the second horizontal portion are at least partially exposed to the first side, and the two first conducting portions and the two second conducting portions are extended to the second side. The first winding set and the second winding set are made by a flat conductive body, respectively.

In accordance with other aspect of the present invention, a manufacturing method of a magnetic component is provided. The manufacturing method includes steps of (a) prefabricating a winding assembly, wherein the winding assembly includes a first winding set and a second winding set, wherein the first winding set includes a first horizontal portion and two first conducting portions, and the two first conducting portions are vertically extended from two ends of the first horizontal portion to form connection terminals of the first winding set; wherein the second winding set includes a second horizontal portion and two second conducting portions, and the two second conducting portions are vertically extended from two ends of the second horizontal portion to form connection terminals of the second winding set, wherein the first horizontal portion of the first winding set and the second horizontal portion of the second winding set are coplanar to form a first coplanar surface and spaced apart with each other at a distance; (b) forming at least one second limitation part to connect the first winding set and the second winding set; and (c) molding the winding assembly and the second limitation part on the first coplanar surface to form a magnetic core by at least one magnetic powder material through a molding tool wherein the magnetic core partially covers the winding assembly, exposes at least the first horizontal portion and the second horizontal portion on the first coplanar surface, and exposes the connection terminals of the first winding set and the connection terminals of the second winding set on a second coplanar surface, wherein the first coplanar surface and the second coplanar surface are opposite to each other.

The above contents of the present invention will become more readily apparent to those ordinarily skilled in the art after reviewing the following detailed description and accompanying drawings, in which:

BRIEF DESCRIPTION OF THE DRAWINGS

FIG. 16 is a flow chart illustrating a manufacturing method of a magnetic component according to an embodiment of the present disclosure;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
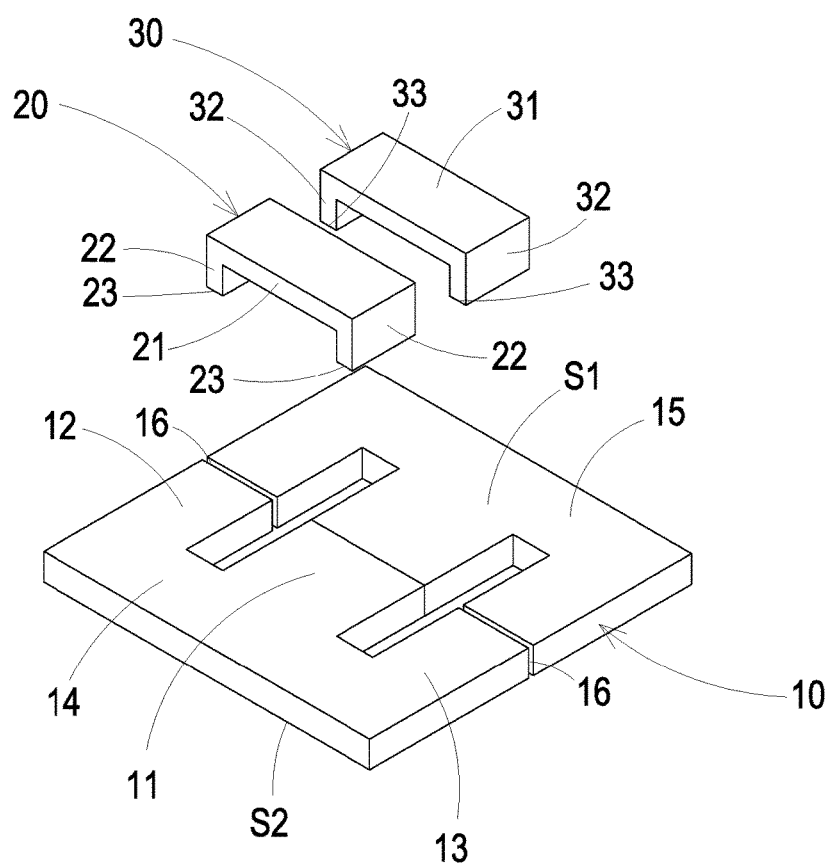
FIG. 1 is an exploded view illustrating a magnetic component according to a first embodiment of the present disclosure.
Figure 2A:
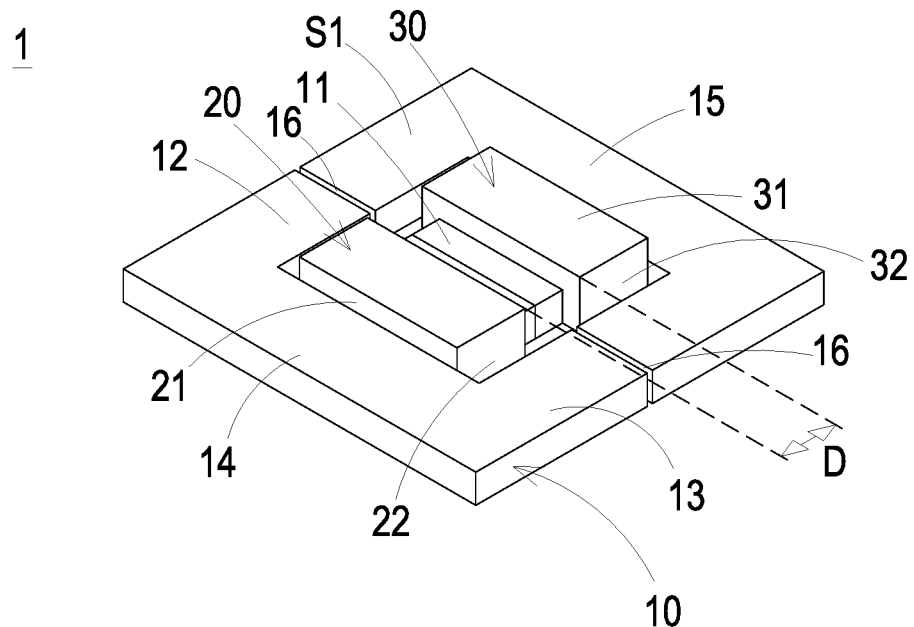
FIG. 2A is a schematic view illustrating the assembled magnetic component of FIG. 1.
Figure 2B:
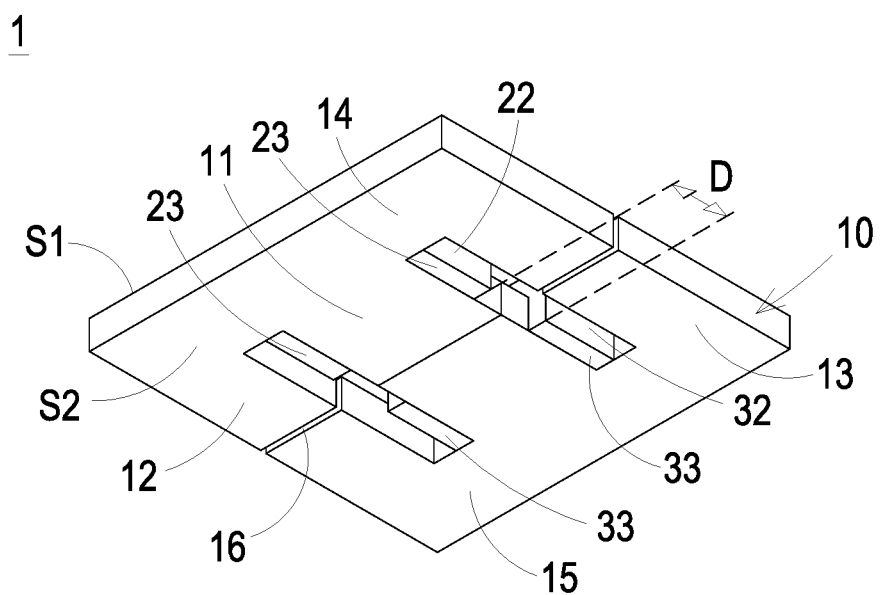
FIG. 2B is another schematic view illustrating the assembled magnetic component of FIG. 1 and taken from another perspective.
Figure 7:
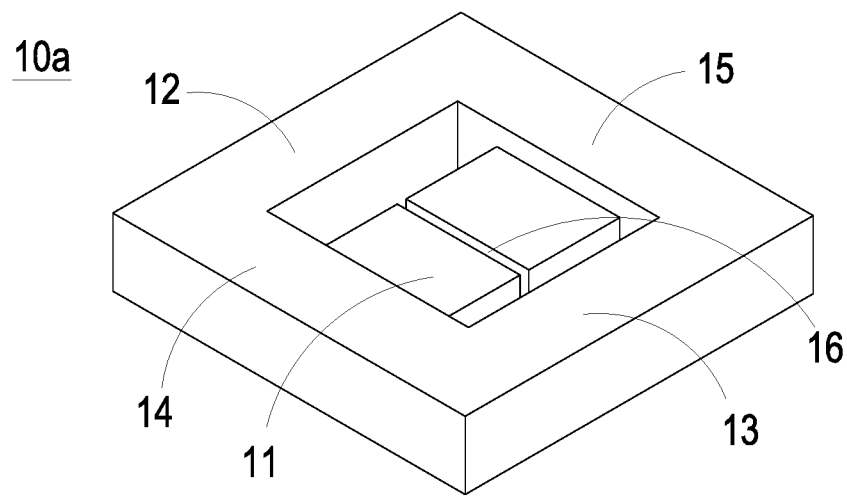
FIG. 7 is a second exemplary structure illustrating the magnetic core of the magnetic component of the present disclosure.

FIG. 1 is an exploded view illustrating a magnetic component according to a first embodiment of the present disclosure. FIGS. 2A and 2B are schematic views illustrating the assembled magnetic component of FIG. 1. As shown in FIG. 1 and FIGS. 2A to 2B, the magnetic component 1 includes a magnetic core 10, a first winding set 20 and a second winding set 30. The magnetic core 10 includes a first magnetic column 11, a second magnetic column 12, a third magnetic column 13 and two connecting portions 14 and 15, which are connected with each other and form at least one air gap 16, a first side S1 and a second side S2. The first side S1 and the second side S2 are opposite to each other. In the embodiment, the two connecting portions 14 and 15 are connected with each other through the first magnetic column 11, the second magnetic column 12 and the third magnetic column 13. Moreover, the first magnetic column 11 is located between the second magnetic column 12 and the third magnetic column 13. Preferably but not exclusively, the magnetic core 10 can be formed, for example, by EE type magnetic cores, EI type magnetic cores or a plurality of sub magnetic cores in combination. Alternatively, the magnetic core 10 can be a monolithic magnetic core, and the present disclosure is not limited thereto. In the embodiment, the air gap 16 is disposed on the first magnetic column 11. Alternatively, two air gaps 16 are disposed on the second magnetic column 12 and the third magnetic column 13. The present disclosure is not limited thereto. In other embodiment, the magnetic core 10 can be for example a monolithic magnetic core, as shown in FIG. 7, and the air gap 16 is formed by cutting, but not limited thereto. The monolithic magnetic core can avoid the tolerance caused by assembling the magnetic core, thereby improving the dimensional accuracy and benefiting to reduce the inductor height. In the embodiment, the first winding set 20 and the second winding set 30 are disposed on the first magnetic column 11 of the magnetic core 10 and spaced apart with each other at a distance D. The first winding set 20 and the second winding set 30 are free of overlapping the at least one air gap 16. Namely, the first winding set 20 and the second winding set 30 are misaligned with the at least one air gap 16. The first winding set 20 includes a first horizontal portion 21 and two first conducting portions 22, and the two first conducting portions 22 are connected to each other through the first horizontal portion 21. In addition, the second winding set 30 includes a second horizontal portion 31 and two second conducting portions 32, and the two second conducting portions 32 connected to each other through the second horizontal portion 31. The direction of the axis of the first magnetic column 11 is referred to a width direction of an inductor. In the embodiment, the first horizontal portion 21 and the second horizontal portion 31 are at least partially exposed on the first side S1. The two first conducting portions 22 and the two second conducting portions 32 are extended to the second side S2 to form connection terminals 23 of the first winding set 20 and connection terminals 33 of the second winding set 30, respectively. Namely, the connection terminals 23 of the first winding set 20 and the connection terminals 33 of the second winding set 30 are configured to form for example, four surface mounting pads or four straight pins of the magnetic component 1. The structure benefits to greatly reduce the thermal resistance of the inductor in the height direction. In the application of such thin inductor, the main channel of heat dissipation is generally located in the height direction, and one end of the winding set is often connected to a main heat source, such as a semiconductor device. Comparing with the magnetic core material, the thermal conductivity of the copper is better. Since a conductive part of the winding set is directly exposed on the first side S1 and the second side S2, the heat can be directly transmitted from the second side S2 to the first side S1 through the conductive part of the winding set. The first side S1 of the magnetic component 1 may further connect a heat sink. It benefits to substantially improve the heat dissipation capability of the inductor in the height direction. Moreover, since the first winding set 20 and the second winding set 30 are disposed on the first magnetic column 11, respectively, and spaced apart with each other at the distance D along the width direction, the leakage inductance of the coupled inductor can be controlled by adjusting the length of the interval distance D. In the embodiment, the cross section of the first winding set 20 and the cross section of the second winding set 30 are a rectangular cross section, respectively. Preferably but not exclusively, a flat wire is formed on the first magnetic column 11 in a winding manner to facilitate the inductor to reduce the entire height thereof, but the present disclosure is not limited thereto. Moreover, in the embodiment, the first winding set 20 and the second winding set 30 can be for example prefabricated and made by a flat conductive body, respectively, and then assembled on the first magnetic column 11 of the magnetic core 10. It benefits to avoid the risk of bending the first winding set 20 and the second winding set 30 after assembling to damage the magnetic core 10. It should be noted that the first winding set 20 and the second winding set 30 can be formed by bending a flat wire or by sheet metal process. In the embodiment, the height of the magnetic component 1 can be for example less than 6 mm and the thickness of the first winding set 20 and the thickness of the second winding set 30 are thicker than 0.2 mm. Since the conductive cross-sectional area is large and the DC resistance is small, it benefits to reduce the copper loss of the inductor. In high-current VRM applications, this part of the loss is even a major part of the total loss of the inductor. Thicker winding set is beneficial to achieve a lower thermal resistance in the direction of height. In addition, the thicker winding set can also provide the sufficient strength in the structure to facilitate the fabrication of the magnetic component 1.

In the embodiment, the magnetic core 10 includes two air gaps 16 disposed on the second magnetic column 12 and the third magnetic column 13, respectively, to achieve a certain self-inductance and avoid the saturation. The first winding set 20 and the second winding set 30 are disposed on the first magnetic column 11 and the air gaps 16 are disposed on the second magnetic column 12 and the third magnetic column 13. Since the first winding set 20, the second winding set 30 and the air gaps 16 are disposed on different magnetic columns, the first winding set 20 and the second winding set 30 can be disposed closely on the first magnetic column 11 and there is no need to consider the fringing loss of the winding set caused by leakage flux of the air gap 16. The currents in the first winding set 20 and the second winding set 30 form a magnetic flux, and the magnetic flux of the first winding set 20 and the second winding set 30 coupled with each other is a main magnetic flux, and the plane of the main magnetic flux is parallel to the plane formed by the connection terminals 23 of the first winding set 20 and the connection terminal 33 of the second winding set 30 on the second side S2. The inductor formed by the magnetic component 1 is projected on the second side S2 to form a centrosymmetric pattern. Since the first winding set 20, the second winding set 30 and the air gaps 16 are centrally symmetrically distributed, it is advantageous to form the symmetric inductance of the two-phase inductor.

Figure 3A:
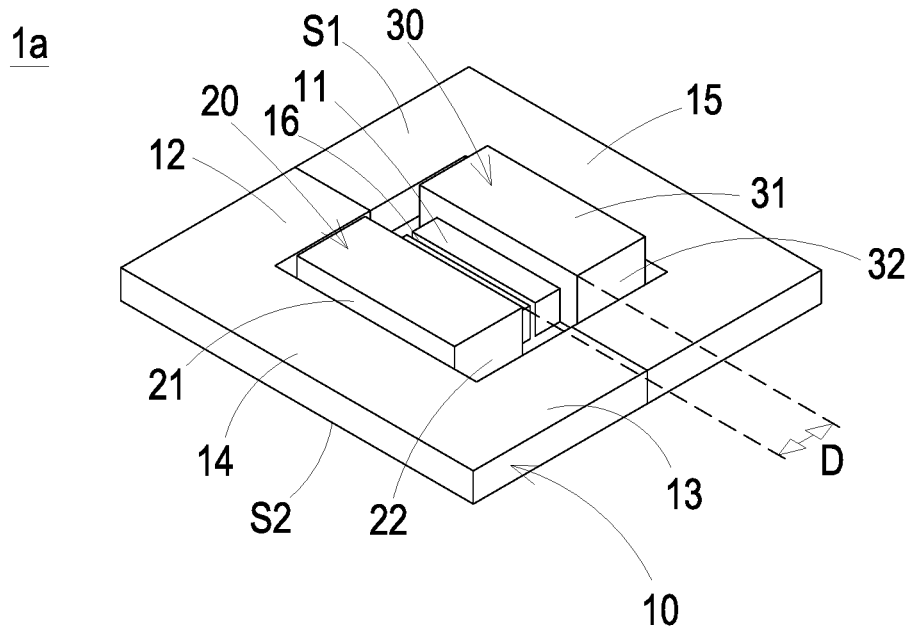
FIG. 3A is a schematic view illustrating a magnetic component according to a second embodiment of the present disclosure.
Figure 3B:
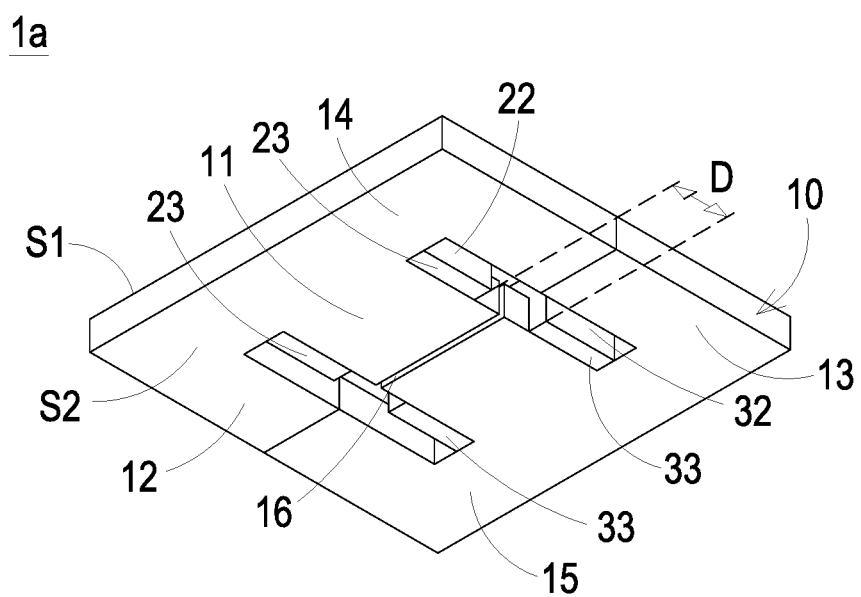
FIG. 3B is another schematic view illustrating the magnetic component according to the second embodiment of the present disclosure and taken from another perspective.

FIGS. 3A and 3B are schematic views illustrating a magnetic component according to a second embodiment of the present disclosure. In the embodiment, the structures, elements and functions of the magnetic component 1a are similar to those of the magnetic component 1 in FIGS. 1 and 2A to 2B, and are not redundantly described herein. In the embodiment, the magnetic core 10 includes an air gap 16 located at the central position of the first magnetic column 11. The first winding set 20 and the second winding set 30 are located at two ends of the first magnetic column 11. The first winding set 20 and the second winding set 30 are free of overlapping the air gap 16. Consequently, the first winding set 20 and the second winding set 30 are disposed closely on the first magnetic column 11. It is beneficial to reduce the overall height of the inductor. In addition, comparing with the magnetic component 1 having the air gaps 16 disposed on the second magnetic column 12 and the third magnetic column 13, in the embodiment, the magnetic component 1a sets the air gap 16 in the middle of the first magnetic column 11 so as to eliminate the leakage flux generated thereof. In some applications, there will be conductive body such as heat sink (not shown) disposed above the inductor. When the inductor is soldered on the PCB, since the heat sink disposed above the inductor is usually made of a conductive material, such as aluminum or copper and the eddy current loss may be generated on the conductive body due to the leakage flux, the smaller leakage flux of the magnetic component 1a can reduce this type of loss. Furthermore, a smaller leakage flux is also beneficial in reducing electromagnetic interference.

Figure 4:
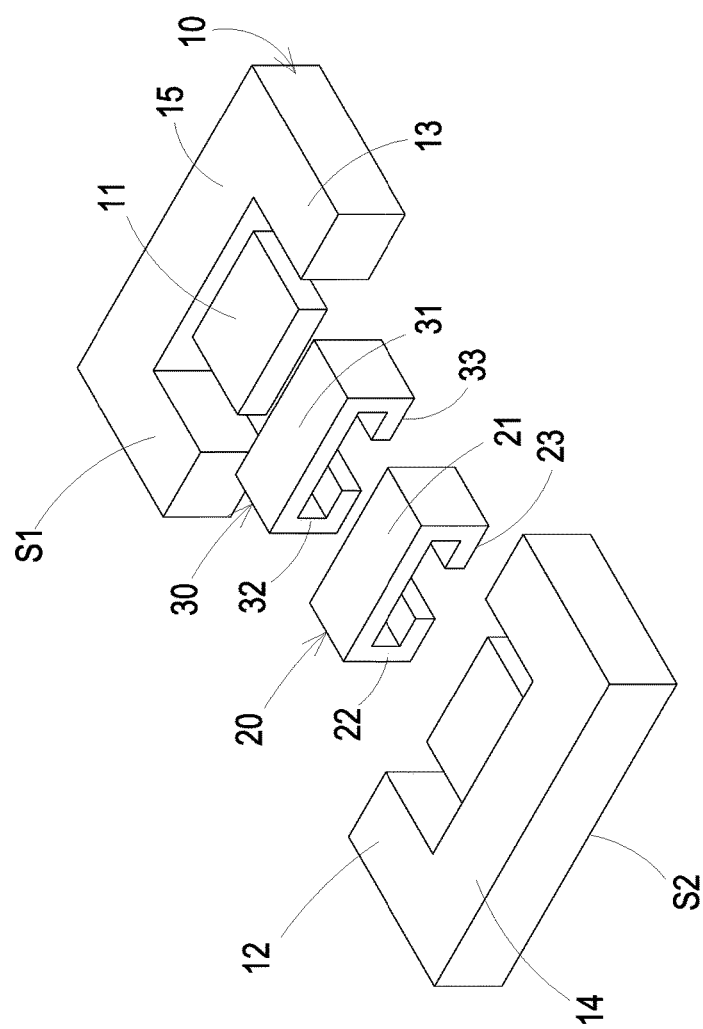
FIG. 4 is an exploded view illustrating a magnetic component according to a third embodiment of the present disclosure.
Figure 5A:
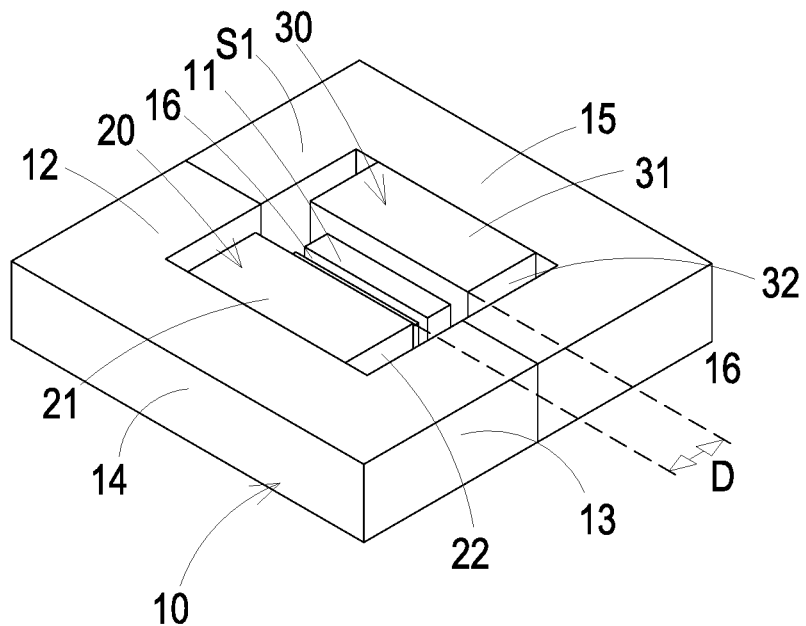
FIG. 5A is a schematic view illustrating the assembled magnetic component of FIG. 4.
Figure 5B:
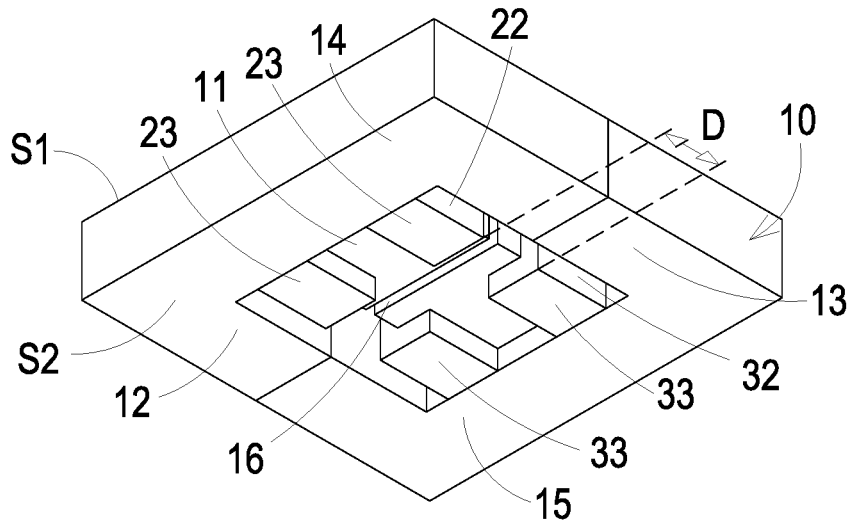
FIG. 5B is another schematic view illustrating the assembled magnetic component of FIG. 4 and taken from another perspective.
Figure 6:
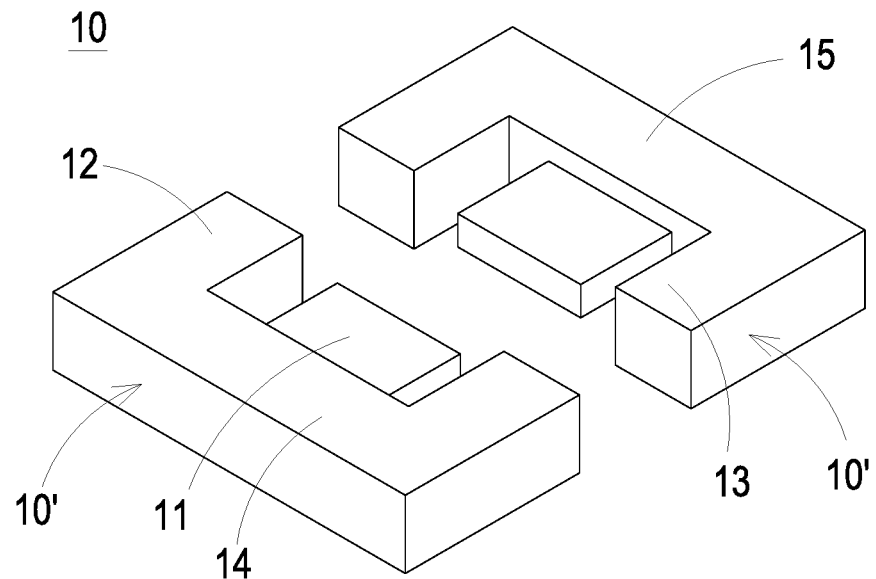
FIG. 6 is a first exemplary structure illustrating the magnetic core of the magnetic component of the present disclosure.

FIG. 4 is an exploded view illustrating a magnetic component according to a third embodiment of the present disclosure. FIGS. 5A and 5B are schematic views illustrating the assembled magnetic component of FIG. 4. In the embodiment, the structures, elements and functions of the magnetic component 1b are similar to those of the magnetic component 1a in FIGS. 3A and 3B, and are not redundantly described herein. In the embodiment, the thickness of the first magnetic column 11 is thinner than the thickness of the second magnetic column 12 and the thickness of the third magnetic column 13, and/or the thicknesses of the connecting portions 14 and 15. Thus, it is advantageous for the magnetic component 1b to further improve space utilization and reduce the entire height or the occupied area. In addition, the first horizontal portion 21 of the first winding set 20, the second horizontal portion 31 of the second winding set 30 and the two connecting portions 14 and 15 are coplanar on the first side S1 of the magnetic core 10, so that it facilitates to attach to for example a heat-dissipation device for heat dissipation. On the other hand, the two connection terminals 23 of the first winding set 20 and the two connection terminals 33 of the second winding set 30 are coplanar on the second side S2 of the magnetic core 10, so that if facilitates to attach to for example a circuit board for electrical connection, but the present disclosure is not limited thereto. Moreover, in the embodiment, as shown in FIG. 6, the magnetic core 10 is formed by assembling two E-type magnetic cores 10'. After assembling, the air gap 16 is formed on the first magnetic column 11 (referred to FIG. 5A), but the present disclosure is not limited thereto. FIG. 7 is a second exemplary structure illustrating the magnetic core of the magnetic component of the present disclosure. The magnetic core 10a is a monolithic core made by a magnetic powder material. The air gap 16 is formed by cutting, but there is no air gap formed on the second magnetic column 12 and the third magnetic column 13. In another embodiment, the magnetic core 10a is made by the magnetic powder material without forming an air gap. The present disclosure is not limited thereto. The monolithic magnetic core 10a is beneficial to eliminate the tolerance caused by assembling the magnetic core, thereby improving the dimensional accuracy. In the embodiment, the magnetic component 1b is for example a two-phase coupled inductor. The connection terminals 23 of the first winding set 20 and the connection terminals 33 of the second winding set 30 are bent toward the center of the first magnetic column 11, to form four surface mounting pads of the magnetic component 1b.

Figure 8A:
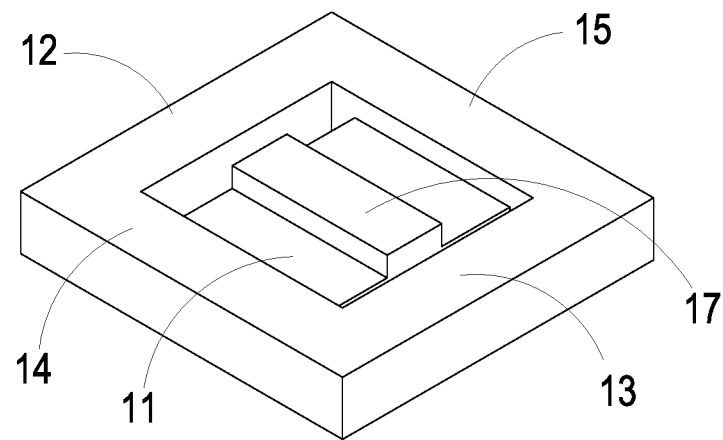
FIG. 8A is a third exemplary structure illustrating the magnetic core of the magnetic component of the present disclosure.
Figure 8B:
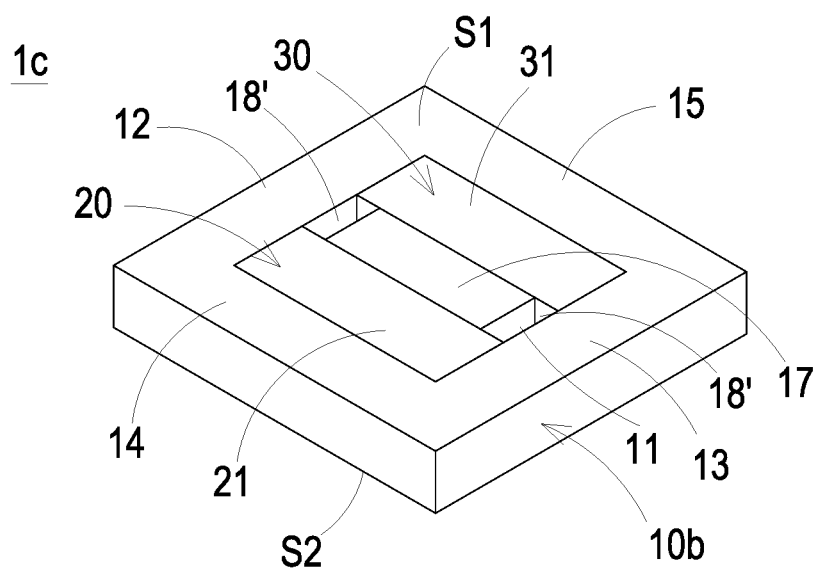
FIG. 8B is a schematic view illustrating a magnetic component according to a fourth embodiment of the present disclosure.

Moreover, in order to facilitate the disposition of the first winding set 20 and the second winding set 30, the first magnetic column 11 further includes a limitation structure. FIG. 8A is a third exemplary structure illustrating the magnetic core of the magnetic component of the present disclosure. FIG. 8B is a schematic view illustrating a magnetic component according to a fourth embodiment of the present disclosure. In the embodiment, the structures, elements and functions of the magnetic component 1c are similar to those of the magnetic component 1b in FIGS. 5A and 5B, and are not redundantly described herein. In the embodiment, the magnetic core 10b includes a first magnetic column 11, a second magnetic column 12, a third magnetic column 13, and two connecting portions 14 and 15 integrally formed into one piece. The monolithic magnetic core 10b further includes a first limitation part 17. The first limitation part 17 is disposed on the first magnetic column 11 and located between the first horizontal portion 21 of the first winding set 20 and the second horizontal portion 31 of the second winding set 30. In addition, the first limitation part 17, the first horizontal portion 21 of the first winding set 20, the second horizontal portion 31 of the second winding set 30 and two connecting portions 14 and 15 are coplanar on the first side S1 of the magnetic core 10b, so as to facilitate the magnetic components 1c to maintain the flatness of the entire structure. The material of the first limitation part 17 and the material of the magnetic core 10b can be similar or not. In the embodiment, the first limitation part 17 is made by the same magnetic powder material of the magnetic core 10b, so as to improve the magnetic performance. It is noted that the magnetic powder material of the magnetic core 10b may be the alloy magnetic powder having a surface coating of the insulated layer and mixed with a certain proportion of glue. Comparing with the ferrite material, the alloy magnetic powder material has a low magnetic permeability, and generally has a relative permeability value ranged from 5 to 100. Thus, the first magnetic column 11, the second magnetic column 12, the third magnetic column 13 and the two connecting portions 14 and 15 are provided without an air gap, and the magnetic core 10b is a monolithic core, as shown in FIG. 8A. The magnetic core 10b is provided without an air gap, and the fringing flux of the air gap can be eliminated, thereby reducing the eddy current loss of the winding set and reducing the leakage flux of the inductor. On the other hand, the saturation flux density of the magnetic powder material is higher than that of the ferrite material. The saturation magnetic flux density of the ferrite material is generally ranged from 0.2 tesla (T) to 0.5 tesla (T), and the saturation magnetic flux density of the magnetic powder material is usually ranged from 0.8 tesla (T) to 1.5 tesla (T). Since the higher saturation flux density is beneficial to greatly reduce the volume of the inductor, it is particularly suitable for applications where the size requirement is critical. Moreover, the alloy magnetic powder material needn't to be sintered at a high temperature, and can be formed by curing, for example, at about 200 degrees Celsius (° C.). Therefore, the magnetic core 10b can be pressed together with the conductive body to form a monolithic inductor. The advantage is remarkable in miniaturization.

Figure 9A:
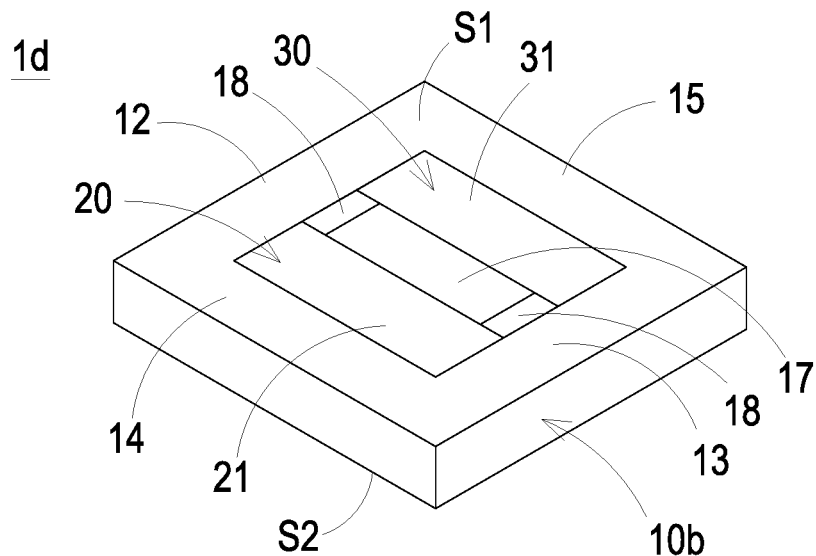
FIG. 9A is a schematic view illustrating a magnetic component according a fifth embodiment of the present disclosure.
Figure 9B:
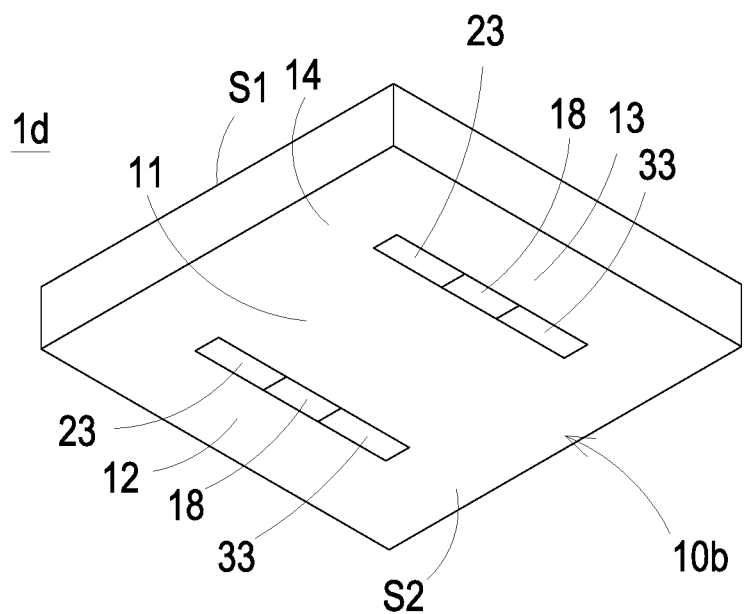
FIG. 9B is another schematic view illustrating the magnetic component according the fifth embodiment of the present disclosure and taken from another perspective.

FIGS. 9A and 9B are schematic views illustrating a magnetic component according a fifth embodiment of the present disclosure. In the embodiment, the structures, elements and functions of the magnetic component 1d are similar to those of the magnetic component 1c in FIG. 8B, and are not redundantly described herein. In the embodiment, the magnetic component 1d further includes at least one second limitation part 18 disposed between the corresponding first winding set 20 and the corresponding second winding set 30, to increase the bonding strength among the first winding set 20, the second winding set 30 and the magnetic core 10b. In the embodiment, two second limitation parts 18 are respectively disposed within two chambers 18' (referred to FIG. 8B) defined and surrounded by the first magnetic column 11, the second magnetic column 12, the third magnetic column 18, the first winding set 20 and the second winding set 30. In the embodiment, the second limitation parts 18 are exposed on the first side S1 and the second side S2 of the magnetic core 10b. Namely, the first limitation part 17, the two second limitation parts 18, the first horizontal portion 21 of the first winding set 20, the second horizontal portion 31 of the second winding set 30 and the two connecting portions 14 and 15 are coplanar on the first side S1 of the magnetic core 10b. Moreover, the two second limitation parts 18, the two connection terminals 23 of the first winding set 20 and the two connection terminals 33 of the second winding set 30 are coplanar on the second side S2 of the magnetic core 10b, to achieve the flatness of the entire structure of the magnetic component 1d. On the other hand, the second limitation parts 18 further provide the function of adjusting the inductive coupling coefficient. In the embodiment, the second limitation parts 18 can be formed, for example, by a non-magnetic material such as an epoxy resin to achieve a better coupling between the first winding set 20 and the second winding set 30. In another embodiment, the second limitation parts 18 can be formed, for example, by a magnetic material, to increase the leakage inductance and reduce the coupling coefficient. In the embodiment, the second limitation part 18 are made by a material having a relative permeability lower than that of the magnetic powder material of the magnetic core 10b, but the present disclosure is not limited thereto.

Figure 10A:
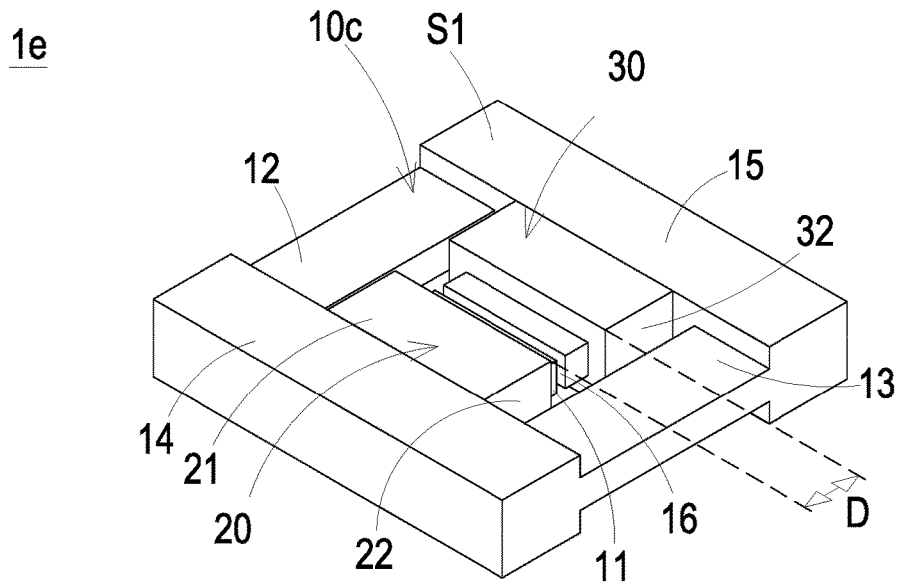
FIG. 10A is a schematic view illustrating a magnetic component according a sixth embodiment of the present disclosure.
Figure 10B:
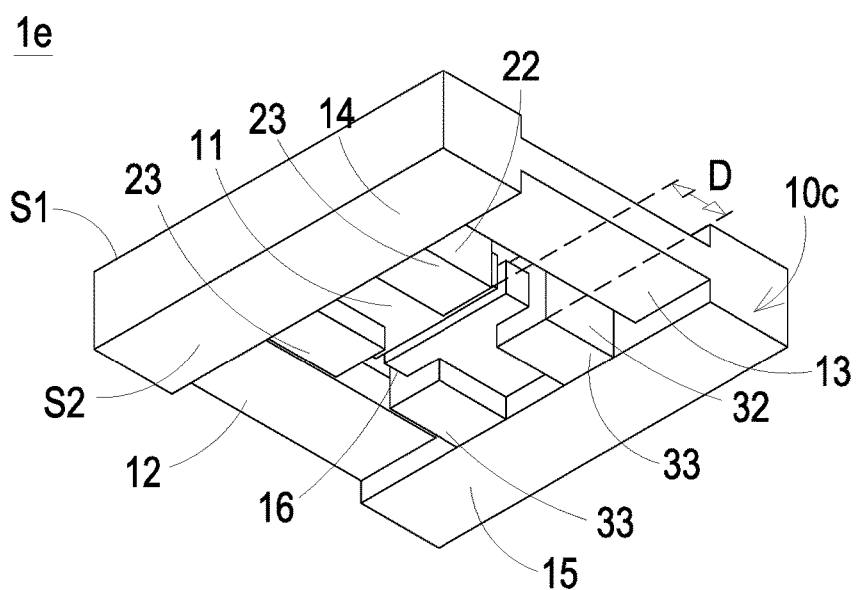
FIG. 10B is another schematic view illustrating the magnetic component according the sixth embodiment of the present disclosure and taken from another perspective.

FIGS. 10A and 10B are schematic views illustrating a magnetic component according a sixth embodiment of the present disclosure. In the embodiment, the structures, elements and functions of the magnetic component 1e are similar to those of the magnetic component 1b in FIGS. 5A and 5B, and are not redundantly described herein. In the embodiment, the magnetic core 10c of the magnetic component 1e can be a monolithic core made by for example a magnetic powder material and includes a first magnetic column 11, a second magnetic column 12, a third magnetic column 13 and two connecting portions 14 and 15. The first horizontal portion 21 of the first winding set 20, the second horizontal portion 31 of the second winding set 30, and the two connecting portions 14 and 15 are coplanar on the first side S1 of the magnetic core 10c. The two connection terminals 23 of the first winding set 20 and the two connection terminals 33 of the second winding set 30 are coplanar on the second side S2 of the magnetic core 10c. Thus, the two connecting portions 14 and 15 can provide the magnetic component 1e with sufficient structural support strength. Furthermore, as shown in FIGS. 8A to 9B, the first limitation part 17 and/or the second limitation parts 18 can be disposed to be coplanar with the other components on the first side S1 and/or the second side S2. The thicknesses of the first magnetic column 11, the second magnetic column 12 and the third magnetic column 13 are thinner than the thicknesses of the two connecting portions 14 and 15, respectively, to facilitate the weight reduction of the magnetic component 1e. In an embodiment, an air gap 16 is disposed on the first magnetic column 11, but there is no air gap formed on the second magnetic column 12 and the third magnetic column 13. Alternatively, the air gaps 16 are disposed on the second magnetic column 12 and the third magnetic column 13, but there is not air gap formed on the first magnetic column 11. In the embodiment, the height of the magnetic component 1e can be for example less than 6 mm and the thickness of the first winding set 20 and the thickness of the second winding set 30 are thicker than 0.2 mm. In addition, the cross section of the first winding set 20 and the cross section of the second winding set 30 are a rectangular cross section, respectively. Preferably but not exclusively, a flat wire is formed on the first magnetic column 11 in a winding manner to facilitate the inductor to reduce the entire height thereof. Certainly, the present disclosure is not limited thereto.

Figure 11A:
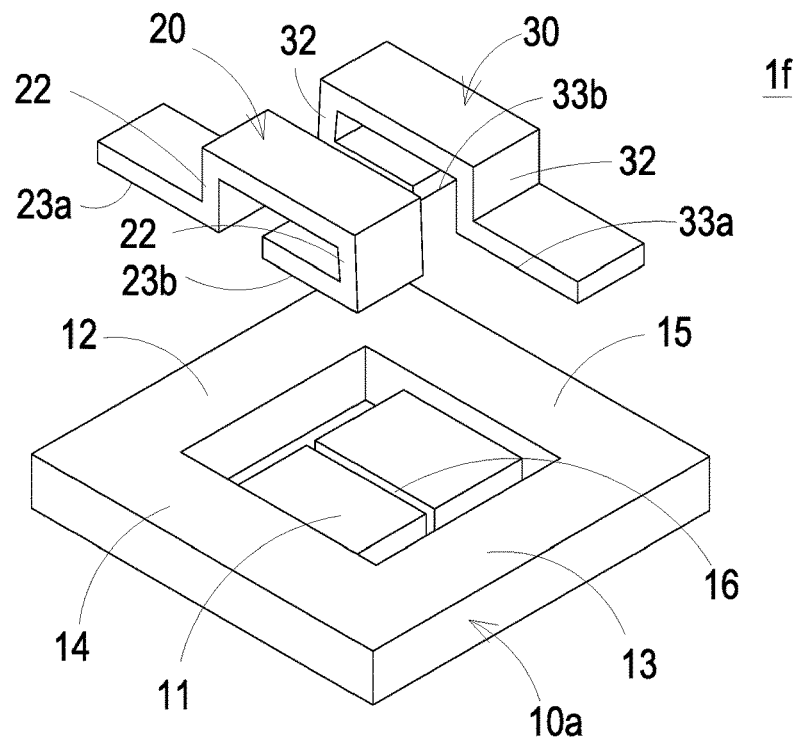
FIG. 11A is an exploded view illustrating the magnetic component according the seventh embodiment of the present disclosure.
Figure 11B:
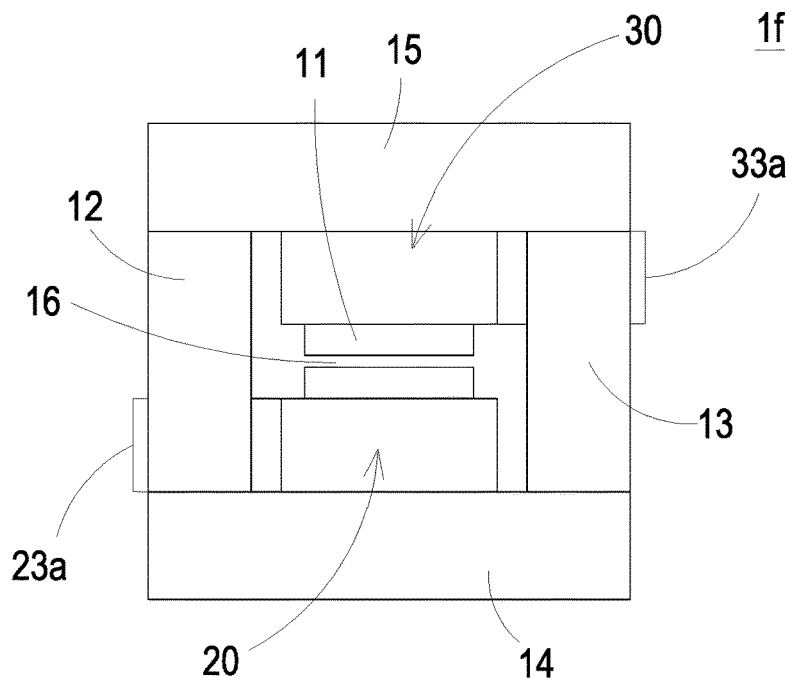
FIG. 11B is a top view illustrating the magnetic component according the seventh embodiment of the present disclosure.
Figure 12A:
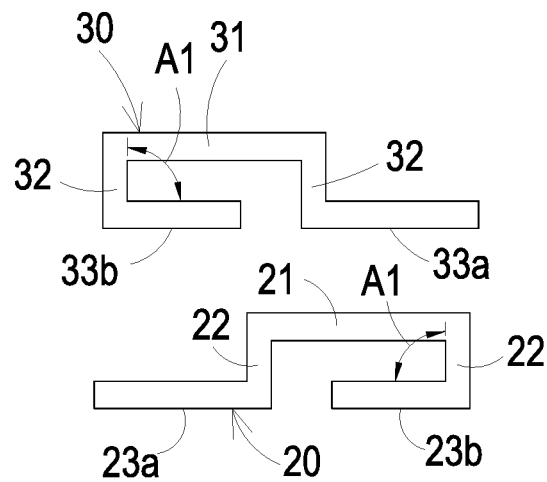
FIG. 12A is a lateral view illustrating the winding sets of the magnetic component according to an exemplary embodiment of the present disclosure.
Figure 12B:
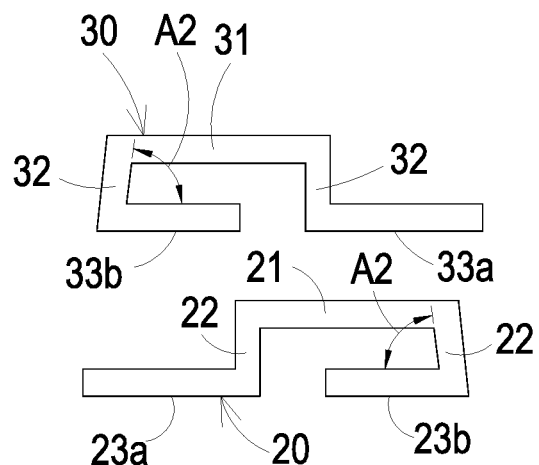
FIG. 12B is a lateral view illustrating the winding sets of the magnetic component according to another exemplary embodiment of the present disclosure.

FIG. 11A is an exploded view illustrating the magnetic component according the seventh embodiment of the present disclosure. FIG. 11B is a top view illustrating the magnetic component according the seventh embodiment of the present disclosure. FIG. 12A is a lateral view illustrating the winding sets of the magnetic component according to an exemplary embodiment of the present disclosure. FIG. 12B is a lateral view illustrating the winding sets of the magnetic component according to another exemplary embodiment of the present disclosure. In the embodiment, the structures, elements and functions of the magnetic component 1f are similar to those of the magnetic component 1b in FIGS. 5A and 5B, and are not redundantly described herein. In the embodiment, the magnetic component 1f is, for example, a two-phase coupled inductor. As shown in FIGS. 11A and 11B, the connection terminal 23a of the first winding set 20 and the connection terminal 33a of the second winding set 30 are bent away from the center of the first magnetic column 11, to form the surface mounting pads, respectively. The connection terminal 23a of the first winding set 20 is bent toward the second magnetic column 12, to form the surface mounting pad located under the second magnetic column 12. The connection terminal 33a of the second winding set 30 is bent toward the third magnetic column 13, to form the surface mounting pad located under the third magnetic column 13. In addition, the connection terminal 23b of the first winding set 20 and the connection terminal 33b of the second winding set 30 of the first magnetic component 1f are bent toward the center of the first magnetic column 11, to form the surface mounting pads of the magnetic component 1f, respectively. In the embodiment, the connection terminals 23a, 23b, 33a and 33b are coplanar on the second side S2 of the magnetic core 10a.

In the embodiment, the first winding set 20 and the second winding set 30 are prefabricated. After the first horizontal portion 21 and the two first conducting portions 22 are formed in a U shape, the two connection terminals 23a and 23b are further formed by bending. Similarly, the second horizontal portion 31 and the two second conducting portions 32 are bent to form a U shape, and then the two connection terminals 33a and 33b are further formed by bending. The prefabricated first winding set 20 and the prefabricated second winding set 30 are assembled with the magnetic core 10a so as to form the magnetic component 1f. Since the thickness of the magnetic core 10a is very thin, it is often difficult to make a bevel on the first magnetic column 11. In order to facilitate the first winding set 20 and the second winding set 30 to assemble with the first magnetic column 11 easily, in an embodiment, the first conducting portion 22 and the connection terminal 23b of the first winding set 20 form an angle A1, and the second conducting portion 32 and the connection terminal 33b of the second winding set 30 form an angle A1. The angle A1 can be, for example, 90 degrees, as shown in FIG. 11A. In another embodiment, the first conducting portion 22 and the connection terminal 23b of the first winding set 20 form an angle A2, and the second conducting portion 32 and the connection terminal 33b of the second winding set 30 form an angle A2. The angle A2 can be, for example, less than 90 degrees. Consequently, the position of the connection terminal 23b relative to the first conducting portion 22 and the position of the connection terminal 33b relative to the second conducting portion 32 are not easily interfered with the first magnetic column 11, the connection terminals 23a and 23b of the first winding set 20 and the connection terminals 33a and 33b of the second winding set 30 are coplanar. The first winding set 20 and the second winding set 30 of the embodiment can be implemented in other embodiments, and the present disclosure is not limited thereto.

Figure 13:
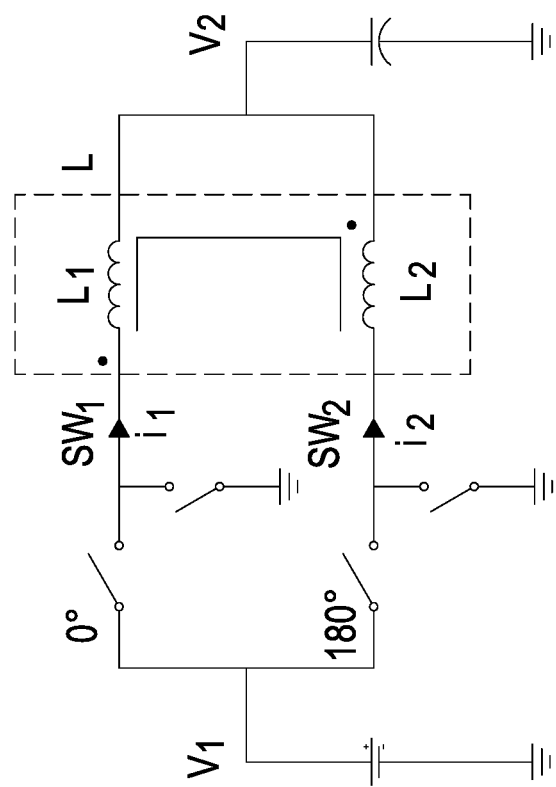
FIG. 13 is an exemplary circuit diagram showing the magnetic component of the present disclosure applied to a two-phase voltage regulator module.
Figure 14A:
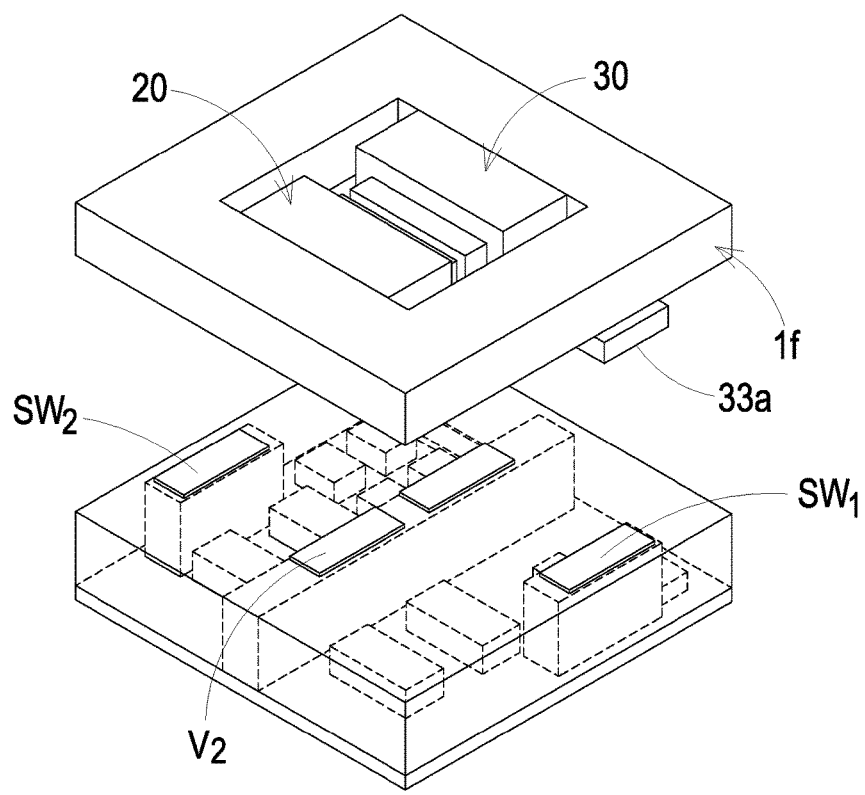
FIG. 14A is a schematic view illustrating the magnetic component of FIG. 11A applied to the two-phase voltage regulator module.
Figure 14B:
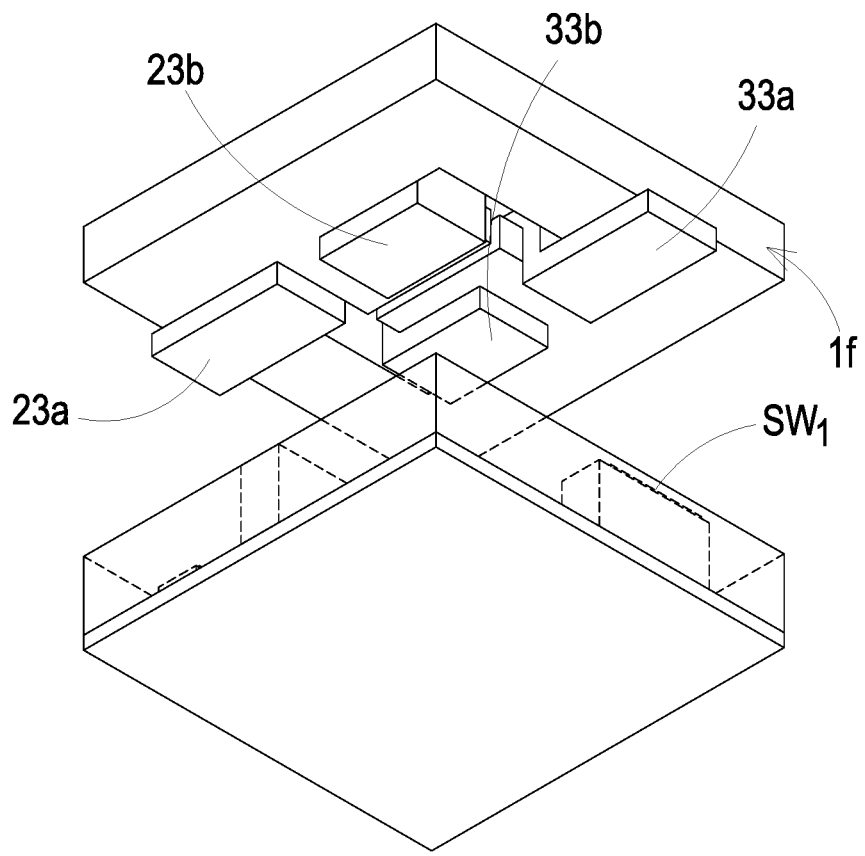
FIG. 14B is another schematic view illustrating the magnetic component of FIG. 11A applied to the two-phase voltage regulator module and taken from another perspective.
Figure 15:
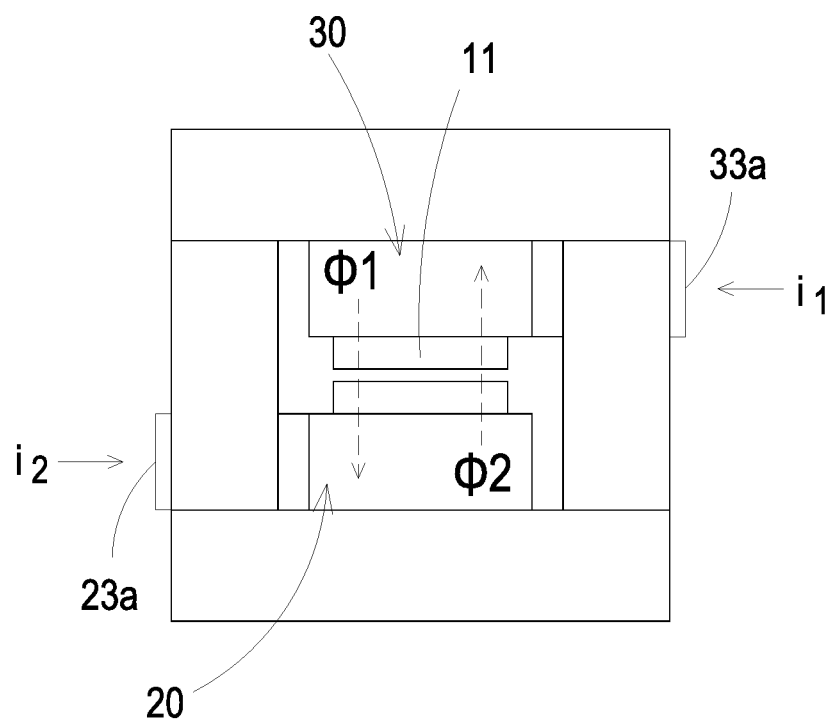
FIG. 15 is a diagram showing the magnetic flux generated by the two-phase coupled inductor when the two-phase voltage regulator module of FIG. 14A is energized.

FIG. 13 is an exemplary circuit diagram showing the magnetic component of the present disclosure applied to a two-phase voltage regulator module. FIGS. 14A and 14B are schematic views illustrating the magnetic component of FIG. 11A applied to the two-phase voltage regulator module. FIG. 15 is a diagram showing the magnetic flux generated by the two-phase coupled inductor. As shown in FIGS. 13 to 15, the two-phase voltage regulator module 9 (hereinafter referred to as VRM 9) converts the input voltage $V_1$ to the output voltage $V_2$ so as to power the load. In order to achieve a larger output current, the VRM 9 is implemented by connecting two phases in parallel. The VRM 9 includes two switch units and a two-phase coupled-inductor module L. The coupled-inductor module L is constructed by the magnetic component 1f, which includes four connection terminals 23a, 23b, 33a and 33b. The connection terminal 33a of the second winding set 30 is connected to a terminal $SW_1$ of a first switch unit to serve as the inductor $L_1$. The connection terminal 23a of the first winding set 20 is connected to a terminal $SW_2$ of a second switch unit to serve as the inductor $L_2$. The connection terminal 23b of the first winding set 20 and the connection terminal 33b of the second winding set 30 are directly connected together to serve as the common output terminal $V_2$ of the entire VRM 9. In order to achieve lower output ripple, the different phases may be operated with a phase difference, which is commonly referred to as an interleaving operation. As shown in FIG. 13, the two phases may differ from each other by 180 degrees. When a first current $I_1$ is supplied to the second winding set 30 through the connection terminal 33a, and a second current $I_2$ is supplied to the first winding set 20 through the connection terminal 23a, respectively, the first current $I_1$ and the second current $I_2$ generate a first magnetic flux $\Phi 1$ and a second magnetic flux $\Phi 2$ in the first magnetic column 11. As shown in FIG. 15, the first magnetic flux $\Phi 1$ and the second magnetic flux $\Phi 2$ have directions opposite to each other in the first magnetic column 11. Therefore, by using the arrangement of the connection terminals 23a, 23b, 33a and 33b of the magnetic component 1f coplanar on the second side S2 of the magnetic core 10a, the interconnection with the switch units can be conveniently realized, and the connection loss can be reduced. Certainly, the two-phase coupled inductor capable of being applied to the two-phase VRM is not limited to the magnetic component 1f of the embodiment, the foregoing various embodiments are applicable, but it is not redundantly described herein.

Figure 17B:
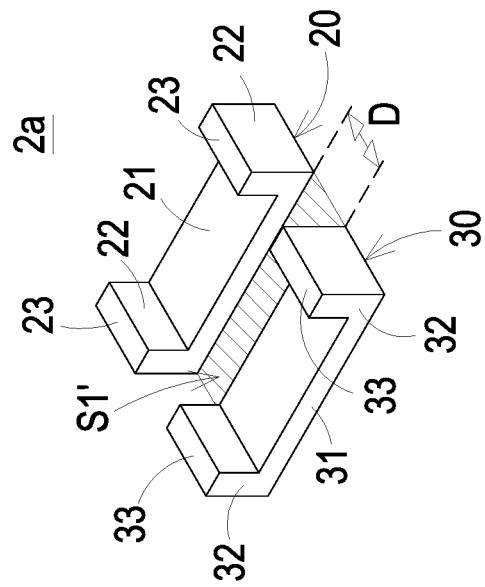
FIGS. 17A to 17F are exemplary structural views illustrating various stages of the manufacturing method of the magnetic component according to an embodiment of the present disclosure.
Figure 17A:
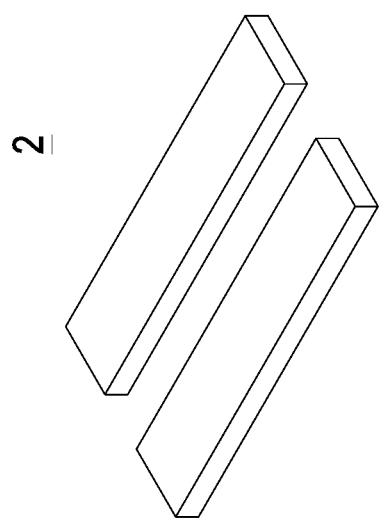
Figure 17D:
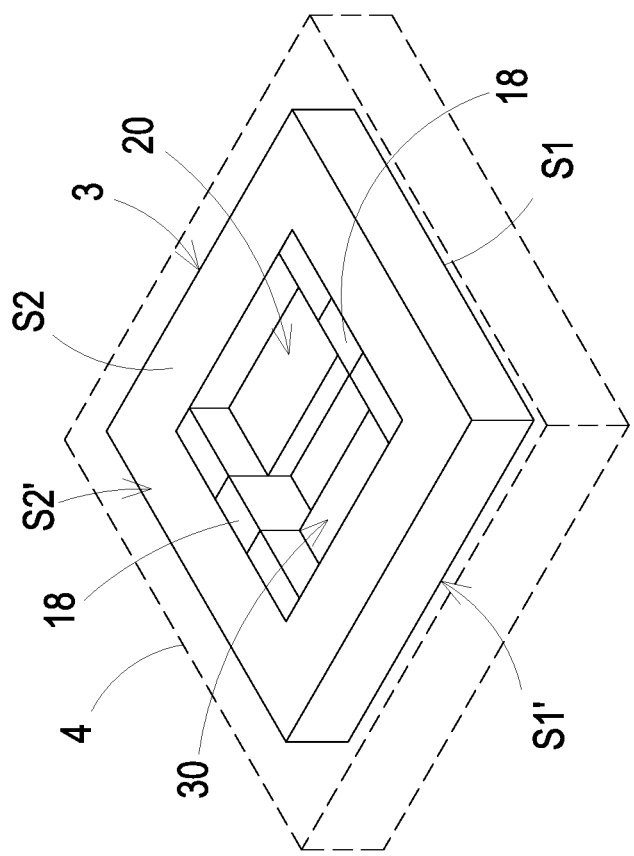
Figure 17C:
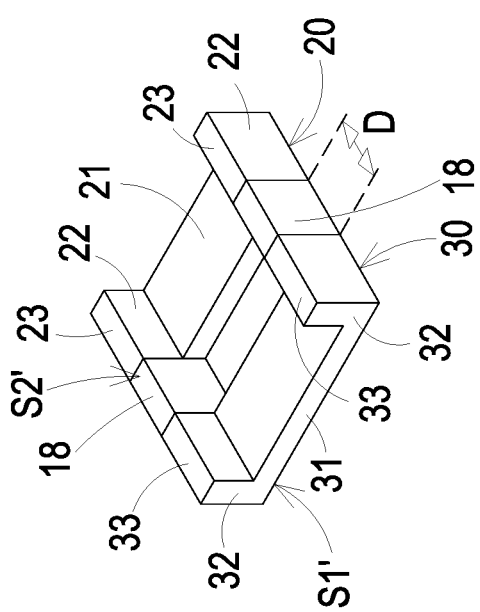
Figure 17F:
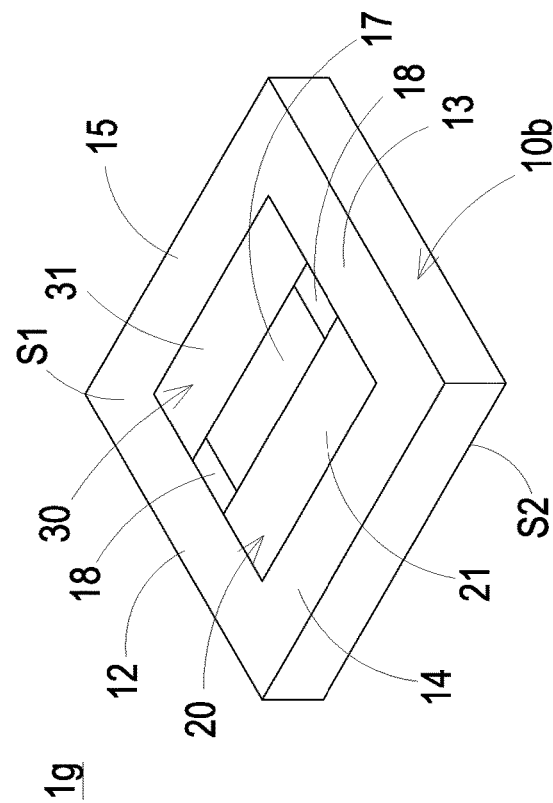
Figure 17E:
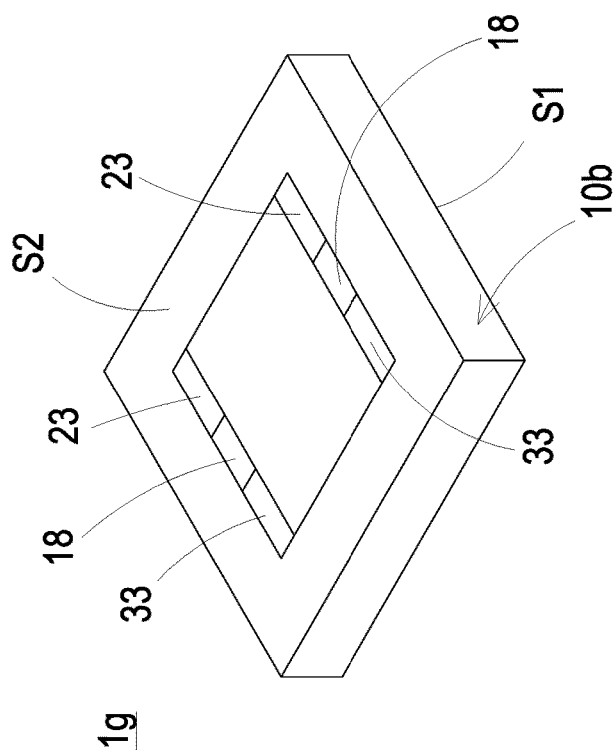

On the other hand, in combination with the prefabricated first winding set 20, the prefabricated second winding set 30 and the formed structure of the magnetic core 10, the present invention further provides a manufacturing method of a magnetic component. FIG. 16 is a flow chart illustrating a manufacturing method of a magnetic component according to an embodiment of the present disclosure. FIGS. 17A to 17F are exemplary structural views illustrating various stages of the manufacturing method of the magnetic component according to an embodiment of the present disclosure. Firstly, at the step S01, a winding assembly 2a is prefabricated. At that step, the winding assembly 2a can be made by, for example, a flat member 2 of the flat copper wire or a copper sheet, as shown in FIG. 17A, which is stamped or bent to form the winding assembly, as shown in FIG. 17B. In the embodiment, the winding assembly 2a includes a first winding set 20 and a second winding set 30. The first winding set 20 includes a first horizontal portion 21 and two first conducting portions 22, and the two first conducting portions 22 are vertically extended from two ends of the first horizontal portion 21 to form connection terminals 23 of the first winding set 20. Moreover, the second winding set 30 includes a second horizontal portion 31 and two second conducting portions 32, and the two second conducting portions 32 are vertically extended from two ends of the second horizontal portion 31 to form connection terminals 33 of the second winding set 30. The first horizontal portion 21 of the first winding set 20 and the second horizontal portion 31 of the second winding set 30 are coplanar to form a first coplanar surface S1' and spaced apart with each other at a distance D. Thereafter, at the step S02, at least one second limitation part 18 is formed to connect the first winding set 20 and the second winding set 30. In the embodiment, there are two second limitation parts 18 disposed between the first conducting portion 22 of the first winding set 20 and the second conducting portion 32 of the second winding set 30, respectively. Moreover, the second limitation parts 18 are exposed on the first coplanar surface S1' and a second coplanar surface S2'. The first coplanar surface S1 and the second coplanar surface S2' are opposite to each other. In the embodiment, the connection terminals 23 of the first winding set 20 and the connection terminals 33 of the second winding set 30 are coplanar with the second limitation parts 18 exposed on the second coplanar surface S2'. In the embodiment, the second limitation parts 18 are made for example by an epoxy material, so as to connect the first conducting portions 22 of the first winding set with the second conducting portions 32 of the second winding set 30, respectively, as shown in FIG. 17C. Finally, at the step S03, as shown in FIG. 17E, a monolithic magnetic core 10b is formed directly. Namely, the winding assembly 2a and the second limitation parts 18 are molded on the first coplanar surface S1 by at least one magnetic powder material through a molding tool 4 to form the magnetic core 10b. In the embodiment, the magnetic core 10b partially covers the winding assembly 2a, exposes at least the first horizontal portion 21 and the second horizontal portion 32 on the first coplanar surface S1', and exposes the connection terminals 23 of the first winding set 20 and the connection terminals 33 of the second winding set 30 on the second coplanar surface S2', as shown in FIGS. 17E and 17F. The first coplanar surface S1' and the second coplanar surface S2' are opposite to each other. It is noted that the manufacturing method of the magnetic component of the present disclosure may be fabricated by an integral molding method and it is not necessary to consider the assembly tolerance between the winding sets and the magnetic core 10. Therefore, it is advantageous for miniaturization of the inductor. In addition, the first winding set 20 and the second winding set 30 of the winding assembly 2a are one turn, respectively. When the molding tool 4 is pressed for molding in the manufacturing processes, the pressure may deform the winding set. Since the first winding set 20 and the second winding set 30 are one turn, respectively, and the thicknesses of the first winding set 20 and the second winding set 30 are thicker, it is easy to control the deformation of the first winding set 20 and the second winding set 30, so as to control the relative positions of the first winding set 20 and the second winding set 30. In the embodiment, the structures, elements and functions of the magnetic component 1g are similar to those of the magnetic component 1d in FIG. 9A to 9B, and are not redundantly described herein. Furthermore, at the step S03, a semi-cured limitation body 3 is prefabricated by at least one magnetic powder material to limit the positions of the winding assembly 2a and the two second limitation parts 18. In the embodiment, the limitation body 3 can be for example a square-ring-shaped structure surrounding the periphery of the first winding set 20, the second winding set 30 and the second limitation parts 18 to limit the positions of the winding assembly 2a and the second limitation parts 18, as shown in FIG. 17D. It should be noted that it is more advantageous for controlling the position of the winding assembly 2a relative to the molding tool 4 in the manufacturing processes by utilizing the limitation body 3. Certainly, the present disclosure is not limited thereto. The semi-cured limitation body 3 at the step S03 is further molded with the other magnetic powder material to form the entire structure of the magnetic core and completely cured.

Figure 18A:
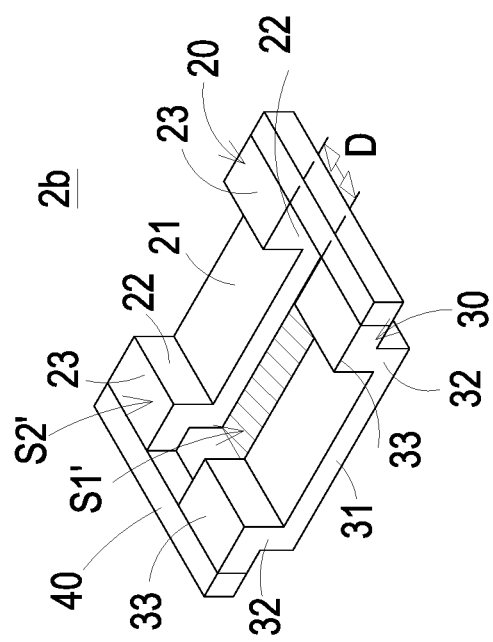
FIG. 18A is an exemplary structural view illustrating a winding assembly used in the manufacturing method of the magnetic component according to the embodiment of the present disclosure.
Figure 18B:
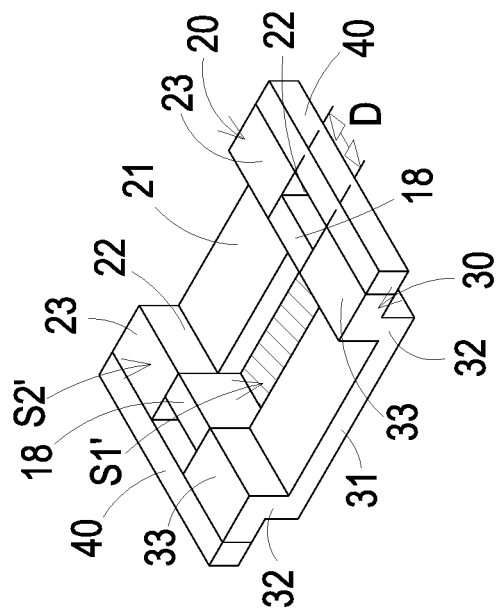
FIG. 18B is an example structural view illustrating the winging assembly of FIG. 18A combined with the second limitation parts according to the embodiment of the present disclosure.

In addition, FIG. 18A is an exemplary structural view illustrating the winding assembly used in the manufacturing method of the magnetic component according to the embodiment of the present disclosure. FIG. 18B is an example structural view illustrating the winging assembly of FIG. 18A combined with the second limitation parts according to the embodiment of the present disclosure. It is noted that the integrally formed winding assembly 2b at the step S01 of the foregoing manufacturing method can be for example a leadframe formed by stamping or bending, as shown in FIG. 18A. In the embodiment, the winding assembly 2b further includes at least one jointing portion 40 to connect the two first conducting portions 22 of the first winding set 20 and the two second conducting portion 32 of the second winding set 30. Thus, the at least one jointing portion 40 can provide a structural support function in the manufacturing process, and it is more advantageous for controlling the first horizontal portion 21 of the first winding set 20 and the second horizontal portion 31 of the second winding set 30 to be coplanar on the first coplanar surface S1' and to be spaced apart with each other at the distance D. At the step S02, the two second limitation parts 18 are located between the first conducing portions 22 of the first winding set 20 and the second conducting portions 32 of the second winding set 30, thereby further strengthening the structural strength of the winding assembly 2b, as shown in FIG. 18B. Thereafter, at the step S03, the at least one jointing portion 40 is removed for example by cutting to form the first winding set 20 and the second winding set 30, and the two limitation parts 18, the connection terminals 23 of the first winding set 20 and the connection terminals 33 of the second winding set 30 are exposed to form the second coplanar surface S2 at the same time. Thus, it is beneficial to avoid the deformation of the winding set and reduce the tolerance caused by the winding assembly, thereby improving the dimensional accuracy.

In summary, the present disclosure provides a magnetic component and a manufacturing method thereof. The magnetic core and the winding sets are combined to form a low profile magnetic component. The overall height of the magnetic component is thin and suitable for applications critical to the requirements of height. The thickness and cross-sectional area of the winding sets are large, and the DC resistance is small, which can reduce the loss of the winding sets of the inductor and strengthen the strength of the structure at the same time. Moreover, it benefits to obtain lower thermal resistance in the height direction through the exposure of the winding sets and the extension of the connection terminals. In addition, the manufacturing process of the magnetic component is simplified, the winding sets can be pre-formed, and it is not necessary to bend the magnetic core with the magnetic core to damage the magnetic core. Consequently, the purposes of simplifying the manufacturing process and reducing the production cost are achieved at the same time.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A magnetic component comprising:
   a monolithic magnetic core comprising a first magnetic column, a second magnetic column, a third magnetic column and two connecting portions, and forming at least one air gap, a first side and a second side, wherein the first side and the second side are opposite to each other, the two connecting portions are connected with each other through the first magnetic column, the second magnetic column and the third magnetic column, and the first magnetic column is located between the second magnetic column and the third magnetic column; and
   a first winding set and a second winding set disposed on the first magnetic column of the magnetic core, spaced apart with each other at a distance and free of overlapping the at least one air gap, wherein the first winding set comprises a first horizontal portion and two first conducting portions, and the two first conducting portions are connected to each other through the first horizontal portion; wherein the second winding set comprises a second horizontal portion and two second conducting portions, and the two second conducting portions connected to each other through the second horizontal portion, wherein the first horizontal portion and the second horizontal portion are at least partially exposed to the first side, and the two first conducting portions and the two second conducting portions are extended to the second side to form connection terminals of the first winding set and connection terminals of the second winding set, respectively.

2. The magnetic component according to claim 1, wherein the at least one air gap is disposed on the first magnetic column, and the first winding set and the second winding set are disposed on two opposite sides of the at least one air gap, respectively.

3. The magnetic component according to claim 1, wherein the at least one air gap includes two air gaps disposed on the second magnetic column and the third magnetic column, respectively.

4. The magnetic component according to claim 1, wherein a thickness of the first magnetic column is thinner than a thickness of the second magnetic column and a thickness of the third magnetic column.

5. The magnetic component according to claim 1, wherein the first magnetic column comprises a first limitation part, wherein the first limitation part is disposed between the first winding set and the second winding set.

6. A magnetic component comprising:
   a magnetic core comprising a first magnetic column, a second magnetic column, a third magnetic column and two connecting portions, and forming at least one air gap, a first side and a second side, wherein the first side and the second side are opposite to each other, the two connecting portions are connected with each other through the first magnetic column, the second magnetic column and the third magnetic column, and the first magnetic column is located between the second magnetic column and the third magnetic column, wherein the at least one air gap is disposed on the first magnetic column; and
   a first winding set and a second winding set disposed on the first column of the magnetic core, spaced apart with each other at a distance and free of overlapping the at least one air gap, wherein the first winding set comprises a first horizontal portion and two first conducting portions, and the two first conducting portions are connected to each other through the first horizontal portion; wherein the second winding set comprises a second horizontal portion and two second conducting portions, and the two second conducting portions connected to each other through the second horizontal portion, wherein the first horizontal portion and the second horizontal portion are at least partially exposed to the first side, and the two first conducting portions and the two second conducting portions are extended to the second side to form connection terminals of the first winding set and connection terminals of the second winding set, respectively.

7. The magnetic component according to claim 6, wherein a thickness of the first magnetic column is thinner than a thickness of the second magnetic column and a thickness of the third magnetic column.

8. The magnetic component according to claim 6, wherein the first magnetic column comprises a first limitation part, wherein the first limitation part is disposed between the first winding set and the second winding set.

9. The magnetic component according to claim 6, wherein the connection terminals include forming angles less than 90 degrees.

10. A magnetic component comprising:
    a magnetic core made of a magnetic powder material, comprising a first magnetic column, a second magnetic column, a third magnetic column and two connecting portions, and forming a first side and a second side, wherein the first side and the second side are opposite to each other, the two connecting portions are connected with each other through the first magnetic column, the second magnetic column and the third magnetic column, and the first magnetic column is located between the second magnetic column and the third magnetic column; and
    a first winding set and a second winding set disposed on the first magnetic column of the magnetic core, spaced apart with each other at a distance, wherein the first winding set comprises a first horizontal portion and two first conducting portions, and the two first conducting portions are connected to each other through the first horizontal portion; wherein the second winding set comprises a second horizontal portion and two second conducting portions, and the two second conducting portions connected to each other through the second horizontal portion, wherein the first horizontal portion and the second horizontal portion are at least partially exposed to the first side, and the two first conducting portions and the two second conducting portions are extended to the second side, wherein the first winding set and the second winding set are made by a flat conductive body, respectively.

11. The magnetic component according to claim 10, wherein the magnetic core is a monolithic core formed by the magnetic powder material.

12. The magnetic component according to claim 10, wherein the first horizontal portion of the first winding set, the second horizontal portion of the second winding set and two connecting portions of the magnetic core are coplanar on the first side.

13. The magnetic component according to claim 10, wherein the two first conducting portions of the first winding set and the two second conducting portions of the second winding set are extended to form connection terminals, respectively, wherein the connection terminals and the two connecting portions of the magnetic core are coplanar on the second side.

14. The magnetic component according to claim 10, wherein the first magnetic column comprises a first limitation part, wherein the first limitation part is disposed between the first horizontal portion of the first winding set and the second horizontal portion of the second winding set.

15. The magnetic component according to claim 10, further comprising a second limitation part, wherein the second limitation part is disposed between the first conducting portion and the second conducting portion.

16. The magnetic component according to claim 15, wherein the second limitation part is made by a material having a relative permeability less than that of the magnetic powder material.

17. The magnetic component according to claim 10, wherein the cross section of the first winding set and the cross section of the second winding set are a rectangular cross section, respectively.

18. The magnetic component according to claim 10, wherein the magnetic core further comprises at least one air gap, wherein the at least one air gap is disposed on the first magnetic core, or the magnetic core further comprises two air gaps disposed on the second magnetic column and the third magnetic column, respectively.

19. The magnetic component according to claim 10, wherein a height of the magnetic component is less than 6 mm and a thickness of the first winding set and a thickness of the second winding set are thicker than 0.2 mm.

20. The magnetic component according to claim 10, wherein the first winding set and the second winding set are one turn, respectively.

21. A manufacturing method of a magnetic component comprising steps of:
  (a) prefabricating a winding assembly, wherein the winding assembly comprises a first winding set and a second winding set, wherein the first winding set comprises a first horizontal portion and two first conducting portions, and the two first conducting portions are vertically extended from two ends of the first horizontal portion to form connection terminals of the first winding set; wherein the second winding set comprises a second horizontal portion and two second conducting portions, and the two second conducting portions are vertically extended from two ends of the second horizontal portion to form connection terminals of the second winding set, wherein the first horizontal portion of the first winding set and the second horizontal portion of the second winding set are coplanar to form a first coplanar surface and spaced apart with each other at a distance;
  (b) forming at least one second limitation part to connect the first winding set and the second winding set; and
  (c) molding the winding assembly and the second limitation part on the first coplanar surface to form a magnetic core by at least one magnetic powder material through a molding tool, wherein the magnetic core partially covers the winding assembly, exposes at least the first horizontal portion and the second horizontal portion on the first coplanar surface, and exposes the connection terminals of the first winding set and the connection terminals of the second winding set on a second coplanar surface, wherein the first coplanar surface and the second coplanar surface are opposite to each other.

22. The manufacturing method according to claim 21, wherein the step (c) further comprising a step of (c0) forming a limitation body by the at least one magnetic powder material to limit the positions of the winding assembly and the second limitation part.

23. The manufacturing method according to claim 22, wherein the limitation body formed by the at least one magnetic powder material at the step (c0) is a square-ring-shaped structure surrounding the periphery of the first winding set, the second winding set and the second limitation part to limit the positions of the winding assembly and the second limitation part.

24. The manufacturing method according to claim 21, wherein the at least one second limitation part includes two second limitation parts disposed between the first conducting portions of the first winding set and the second conducting portions of the second winding set, wherein the second limitation parts are exposed on the first coplanar surface and the second coplanar surface.

25. The manufacturing method according to claim 21, wherein the winding assembly at the step (a) is integrally formed into one piece and comprises at least one jointing portion to connect the two first conducting portions and the two second conducting portions, wherein the step (c) further comprises a step of (c2) removing the at least one jointing portion to form the first winding set and the second winding set.

* * * * *